UNITED STATES PATENT OFFICE.

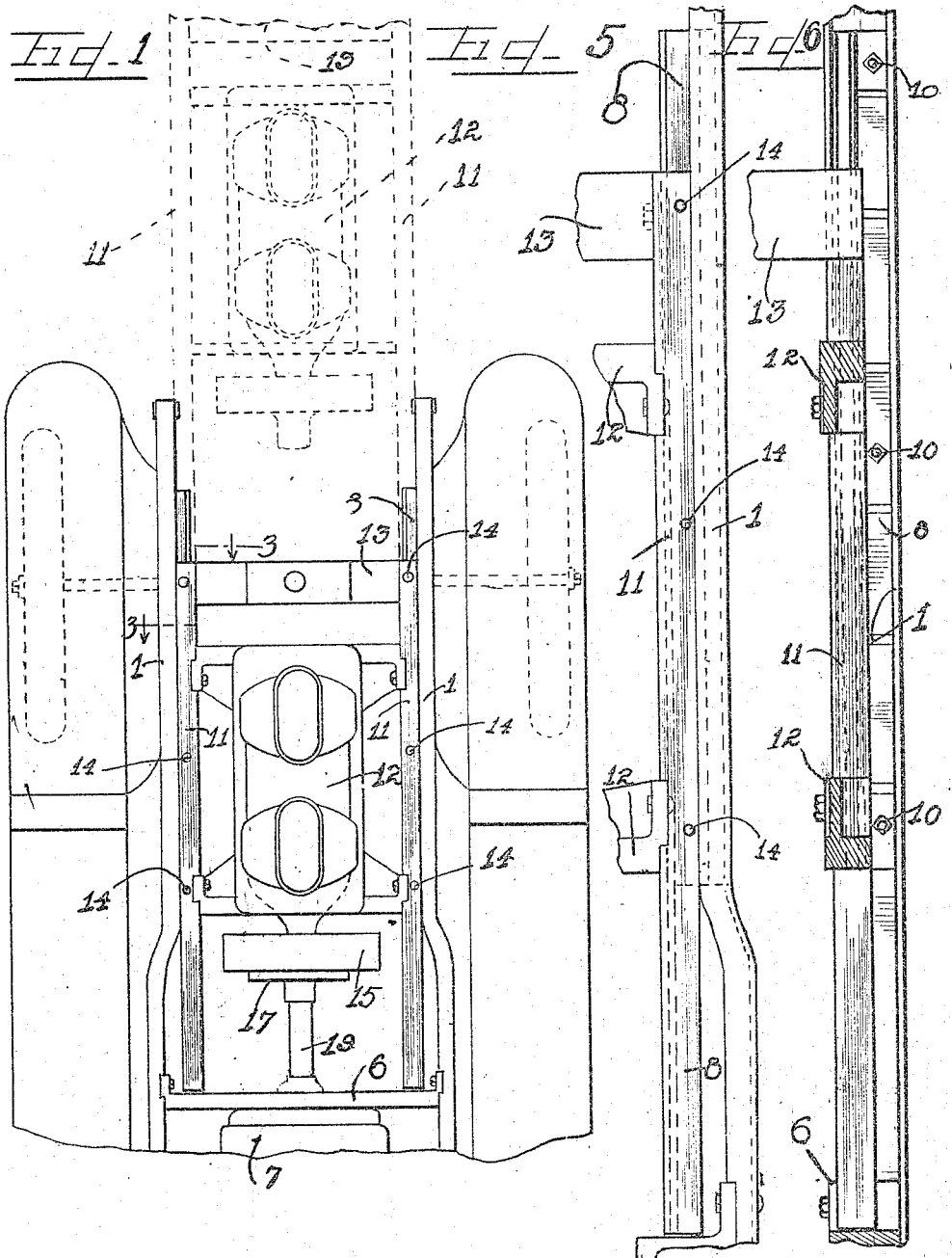

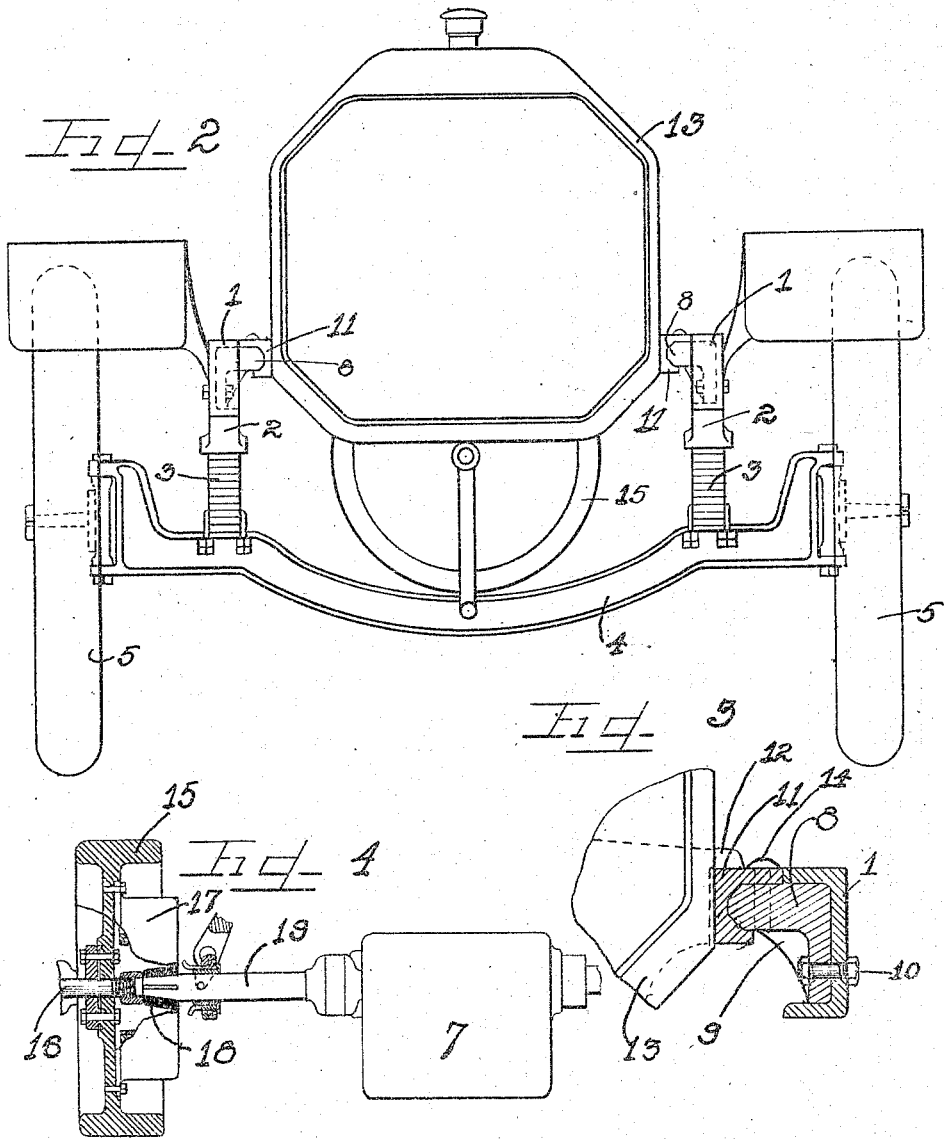

ROBERT E. PETRIE, OF CHICAGO, ILLINOIS.

ENGINE-ATTACHING MEANS FOR VEHICLES.

1,326,960.     Specification of Letters Patent.     Patented Jan. 6, 1920.

Application filed April 2, 1917. Serial No. 159,300.

*To all whom it may concern:*

Be it known that I, ROBERT E. PETRIE, a citizen of the United States, and a resident of the city of Chicago, in the county of Cook and State of Illinois, have invented certain new and useful Improvements in Engine-Attaching Means for Vehicles; and I do hereby declare that the following is a full, clear, and exact description of the same, reference being had to the accompanying drawings, and to the numerals of reference marked thereon, which form a part of this specification.

This invention relates to an engine sub-frame constructed to slide within the usual chassis frame sills of a motor car to permit ready detachment of the engine from the vehicle so as to make the same easily accessible for repair or replacement by another motor if desired. In practically every type of motor vehicle, the chassis sills of the frame at the forward end of the vehicle are parallel or nearly so, and I propose to provide the chassis sills with parallel guide members which will strengthen the chassis frame sills and on which a sub-frame is movable, carrying the engine.

It is an object therefore of this invention to construct a removable sub-frame to support an engine or motor upon a vehicle, and permitting ready removal of the engine or motor from the vehicle by adjustment of the sub-frame.

It is also an object of this invention to construct a sub-frame movable upon guides secured into the main frame of a vehicle, and adapted to be positively connected with said guides to prevent movement with respect thereto to maintain the motor rigidly supported and properly disposed in the vehicle.

It is a further object of this invention to construct a vehicle provided with a sub-frame detachable therefrom carrying the complete motor assembly and radiator of the vehicle whereby the complete motor and radiator may be removed from the vehicle for examination, test or repair.

Other and further important objects of the invention will be evident by the disclosure in the drawing and specification.

The invention (in a preferred form) is illustrated in the drawings and hereinafter more fully described.

On the drawings:

Figure 1 is a top plan view of the forward portion of a chassis of a motor car, illustrating adjustment of the motor and the sub-frame in dotted lines.

Fig. 2 is a front end view of the motor car chassis with parts omitted.

Fig. 3 is a sectional detail on line 3—3 of Fig. 1.

Fig. 4 is a sectional detail through the fly wheel and clutch of the motor car mechanism showing method of disconnecting the transmission shaft.

Fig. 5 is a fragmentary enlarged top plan view of one of the chassis sills and one of the sills of the sub-frame.

Fig. 6 is a side interior elevation thereof.

As shown on the drawings:

Referring to Fig. 1, the main chassis sills of the vehicle frame are denoted by the reference numerals 1, and at their forward ends are provided with brackets denoted by the reference numeral 2, connected upon the front springs 3. The springs 3, are supported upon a front axle 4, and on the ends of the axle, wheels 5, are adjustably journaled for steering in a usual manner. Attached between said main frame sills 1, is a cross frame member 6, which affords a means of support for any conventional type of transmission 7.

As shown clearly in Fig. 3, long guide members 8, of angle section, provided with reinforcing webs 9, at points therealong, are secured into the channel shaped frame sills 1, of the vehicle by means of attaching bolts 10, and project inwardly between the frame sills 1, beyond the top flanges of said sills. The inner edges of said respective guide members are beveled off, as clearly shown in Fig. 3, and slidably mounted upon said guide members are sills 11, of a sub-frame on which an engine 12, is rigidly secured by means of engine supporting brackets generally provided for the purpose. Also supported upon the sills 11, of the sub-frame is a radiator 13, which is bodily adjustable with said sub-frame and engine 12. For the purpose of anchoring the sub-frame in position upon the guides 8, of the main frame sills 1, taper pins 14, are provided adapted to be driven through said sub-frame sills 11, and guides 8, in apertures provided therefor when the respective apertures of the sub-frame sills and guides 8, are brought into register with one another.

The fly wheel of the engine is denoted by the reference numeral 15, and, as shown in detail in Fig. 4, is secured upon the rear end of the crank shaft of the motor, denoted by the reference numeral 16. A clutch housing 17, is secured upon the fly wheel and projecting thereinto and formed to interlock with the inner spider 18, of the clutch, is a transmission shaft 19. The construction is such that the motor on the sub-frame may be drawn away from the shaft section 19, without necessitating disassembly of the parts.

The operation is as follows:

If it is desired to withdraw the motor from the chassis of the vehicle, the pins 14, which anchor the motor sub-frame 11, upon the main frame 1, of the vehicle, are removed, and the sub-frame is then drawn along outwardly on the main frame, as shown in dotted lines in Fig. 1. Of course, any suitable supporting means is provided for the forward end of the sub-frame when it is moved into the adjusted position shown in Fig. 1. The sub-frame, when moved into such position, carries with it as a unit the radiator and power plant of the vehicle, the shaft section 19, merely sliding from within the clutch spider as the motor is drawn along with the sub-frame.

I am aware that my invention is susceptible of many modifications, but I purpose claiming broadly the idea of mounting a motor upon a sub-frame slidable upon suitable guides in the main frame of a vehicle, and I therefore do not purpose limiting the patent granted otherwise than necessitated by the prior art.

I claim as my invention:

1. The combination with the chassis sills of a vehicle, of angle guide members rigidly secured in said sills and projecting therefrom, grooved sub-frame sills slidably engaged on the projecting portions of said guide members, and a power plant for the vehicle mounted on said sub-frame sills.

2. The combination with the chassis channel sills of a vehicle, of angle guide members rigidly secured in said channel sills with the horizontal flanges thereof projecting therefrom, grooved sub-frame sills slidable on said horizontal flanges of said guide members, said horizontal flanges of said guide members and said sub-frame sills having openings therein, a power plant for the vehicle mounted on said sub-frame sills adapted to be moved longitudinally with said sub-frame sills on said guide members, and pins adapted to engage through the openings in said sub-frame sills and in said horizontal flanges of said guide members when said openings are in register to secure the sub-frame sills and the power plant in position on the vehicle chassis.

In testimony whereof I have hereunto subscribed my name in the presence of two subscribing witnesses.

ROBERT E. PETRIE.

Witnesses:
EARL W. ROBINSON,
CHARLES W. HILLS, Jr.